US012430400B2

(12) United States Patent
Chang et al.

(10) Patent No.: US 12,430,400 B2
(45) Date of Patent: Sep. 30, 2025

(54) MULTI-CLASS CLASSIFICATION USING A DUAL MODEL

(71) Applicant: International Business Machines Corporation, Armonk, NY (US)

(72) Inventors: Chao-Min Chang, Taipei (TW); Yu-Chi Tang, New Taipei (TW); Bo-Yu Kuo, Kaohsiung (TW); Yu-Jin Chen, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 17/376,631

(22) Filed: Jul. 15, 2021

(65) Prior Publication Data

US 2023/0014551 A1    Jan. 19, 2023

(51) Int. Cl.
*G06N 3/08* (2023.01)
*G06F 18/21* (2023.01)
*G06F 18/2113* (2023.01)
*G06F 18/2431* (2023.01)
(Continued)

(52) U.S. Cl.
CPC ...... *G06F 18/2163* (2023.01); *G06F 18/2113* (2023.01); *G06F 18/2431* (2023.01); *G06N 3/08* (2013.01); *G06N 5/01* (2023.01); *G06N 20/20* (2019.01)

(58) Field of Classification Search
USPC .......................................................... 706/45
See application file for complete search history.

(56) References Cited

U.S. PATENT DOCUMENTS 6,047,277 A  *  4/2000  Parry ..................... G06F 40/279
                                                706/14
7,409,371 B1 *  8/2008  Heckerman ............ G06N 20/00
                                                706/45
(Continued)

FOREIGN PATENT DOCUMENTS

WO         2018223330  A1     12/2018
WO         2020185101  A1      9/2020

OTHER PUBLICATIONS

Denis, et al., "Confidence Sets with Expected Sizes for Multiclass Classification", Journal of Machine Learning Research 18 (2017), Oct. 2017, 28 pgs.
(Continued)

*Primary Examiner* — Vincent Gonzales
*Assistant Examiner* — Em N Trieu
(74) *Attorney, Agent, or Firm* — Joseph P. Curcuru

(57) ABSTRACT

A method for receiving a full training data set including a plurality of individual training data set, dividing the plurality of individual training sets into N classes, where N is an integer greater than three, dividing the N classes into M full data classes and N-M partial data classes, performing training to obtain a trained fixed size machine learning (ML) classification model and a trained in-class confidence model, outputting a first set of prediction value(s) based on the performance of training, distributing each class of the N classes of individual training data sets to a different node of a distributed machine learning system; and outputting, from the nodes of the distributed machine learning system, a second set of prediction value(s) for each class of the N classes.

17 Claims, 5 Drawing Sheets

(51) Int. Cl.
*G06N 5/01* (2023.01)
*G06N 20/20* (2019.01)

(56) References Cited

U.S. PATENT DOCUMENTS

| | | | | |
|---|---|---|---|---|
| 8,788,444 B2* | 7/2014 | Ball | ................. | G16B 40/20 |
| | | | | 700/250 |
| 9,390,376 B2 | 7/2016 | Harrison | | |
| 9,633,315 B2 | 4/2017 | Chapelle | | |
| 10,360,500 B2* | 7/2019 | Kabul | ................. | G06N 3/08 |
| 2004/0249628 A1* | 12/2004 | Chelba | ................. | G06F 40/44 |
| | | | | 704/4 |
| 2007/0073540 A1* | 3/2007 | Hirakawa | ................. | G10L 15/22 |
| | | | | 704/E15.04 |
| 2009/0192957 A1* | 7/2009 | Subramanian | ..... | G06Q 30/0202 |
| | | | | 705/7.31 |
| 2009/0292386 A1* | 11/2009 | Cheng | ............. | G05B 19/41875 |
| | | | | 700/109 |
| 2017/0279696 A1 | 9/2017 | Vasseur | | |
| 2017/0279833 A1 | 9/2017 | Vasseur | | |
| 2017/0279834 A1 | 9/2017 | Vasseur | | |
| 2018/0247226 A1* | 8/2018 | Forman | ................. | G06F 18/214 |
| 2018/0358001 A1* | 12/2018 | Amid | ................. | G06F 16/3329 |
| 2019/0303666 A1* | 10/2019 | Summers | ................. | G06N 3/08 |
| 2020/0094784 A1* | 3/2020 | Herman | ................. | B60S 1/0848 |
| 2021/0081848 A1 | 3/2021 | Polleri | | |
| 2021/0117868 A1* | 4/2021 | Sriharsha | ............... | G06N 20/20 |
| 2021/0311728 A1* | 10/2021 | Raiskin | ................. | G06F 40/143 |

OTHER PUBLICATIONS

Joshi, "Scalable Algorithms for Large-Scale Machine Learning Problems: Application to Multiclass Classification and Asynchronous Distributed Optimization", HAL Archives-Ouvertes, HAL Id: tel-02402056, Dec. 10, 2019, 151 pgs., Universite Grenoble Alpes, <https://tel.archives-ouvertes.fr/tel-02402056/document>.

* cited by examiner

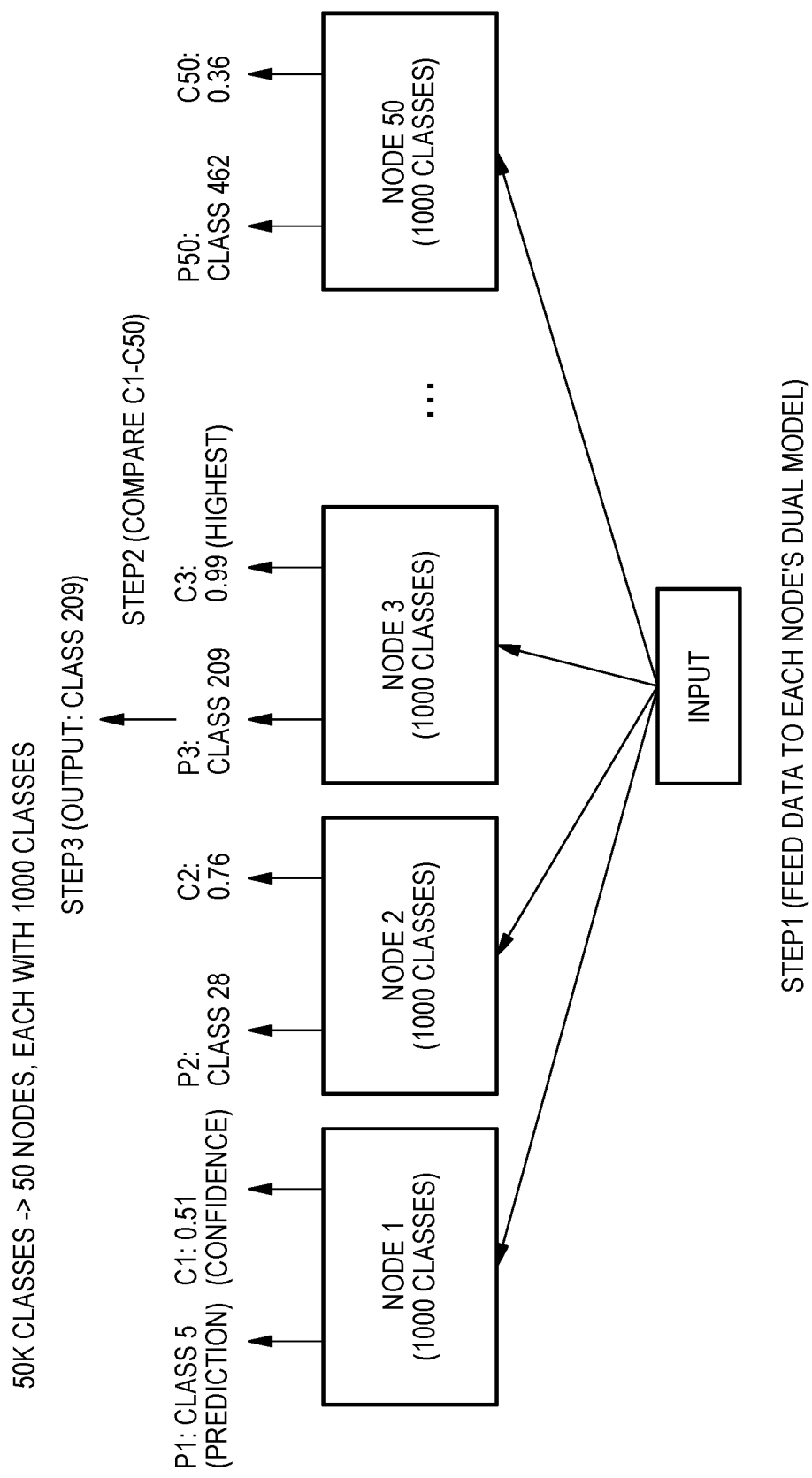

MULTI-CLASS CLASSIFICATION USING A DUAL MODEL

BACKGROUND

The present invention relates generally to the field of multiclass classification and also to the field of distributed learning (sometimes herein referred to as "distributed artificial intelligence").

The Wikipedia entry for "multiclass classification" (as of 13 Jun. 2021) states, in part, as follows: "In machine learning, multiclass or multinomial classification is the problem of classifying instances into one of three or more classes (classifying instances into one of two classes is called binary classification). While many classification algorithms (notably multinomial logistic regression) naturally permit the use of more than two classes, some are by nature binary algorithms; these can, however, be turned into multinomial classifiers by a variety of strategies. Multiclass classification should not be confused with multi-label classification, where multiple labels are to be predicted for each instance. . . . Learning paradigms . . . Based on learning paradigms, the existing multi-class classification techniques can be classified into batch learning and online learning. Batch learning algorithms require all the data samples to be available beforehand. It trains the model using the entire training data and then predicts the test sample using the found relationship. The online learning algorithms, on the other hand, incrementally build their models in sequential iterations. In iteration t, an online algorithm receives a sample, xt and predicts its label ŷt using the current model; the algorithm then receives yt, the true label of xt and updates its model based on the sample-label pair: (xt, yt). Recently, a new learning paradigm called progressive learning technique has been developed. The progressive learning technique is capable of not only learning from new samples but also capable of learning new classes of data and yet retain the knowledge learnt thus far." (footnotes omitted)

The Wikipedia entry for "distributed artificial intelligence" (as of 13 Jun. 2021) states, in part, as follows: "Distributed Artificial Intelligence (DAI) also called Decentralized Artificial Intelligence is a subfield of artificial intelligence research dedicated to the development of distributed solutions for problems. DAI is closely related to and a predecessor of the field of multi-agent systems. . . . Distributed Artificial Intelligence (DAI) is an approach to solving complex learning, planning, and decision making problems. It is embarrassingly parallel, thus able to exploit large scale computation and spatial distribution of computing resources. These properties allow it to solve problems that require the processing of very large data sets. DAI systems consist of autonomous learning processing nodes (agents), that are distributed, often at a very large scale. DAI nodes can act independently and partial solutions are integrated by communication between nodes, often asynchronously. By virtue of their scale, DAI systems are robust and elastic, and by necessity, loosely coupled. Furthermore, DAI systems are built to be adaptive to changes in the problem definition or underlying data sets due to the scale and difficulty in redeployment. DAI systems do not require all the relevant data to be aggregated in a single location, in contrast to monolithic or centralized Artificial Intelligence systems which have tightly coupled and geographically close processing nodes. Therefore, DAI systems often operate on sub-samples or hashed impressions of very large datasets. In addition, the source dataset may change or be updated during the course of the execution of a DAI system. . . . Two types of DAI has emerged: In Multi-agent systems agents coordinate their knowledge and activities and reason about the processes of coordination. Agents are physical or virtual entities that can act, perceive its environment and communicate with other agents. The agent is autonomous and has skills to achieve goals. The agents change the state of their environment by their actions. There are a number of different coordination techniques. In distributed problem solving the work is divided among nodes and the knowledge is shared. The main concerns are task decomposition and synthesis of the knowledge and solutions." (footnotes omitted)

SUMMARY

According to an aspect of the present invention, there is a method, computer program product and/or system that performs the following operations (not necessarily in the following order): (i) receiving a full training data set including a plurality of individual training data set, with each individual training data set including a plurality of individual training data sets, with each individual training data set including data relating to a historical instantiation of a situation that is relevant to training; (ii) dividing the plurality of individual training sets into N classes, where N is an integer greater than three; (iii) dividing the N classes into M full data classes and N-M partial data classes; (iv) performing training to obtain a trained fixed size machine learning (ML) classification model and a trained in-class confidence model, including the following types of training: (a) training a fixed sized machine learning (ML) classification model using the individual training data sets in the full data classes, (b) training an in-class confidence model using the individual training data sets in the full data classes, and (c) training the in-class confidence model using the individual training data sets in the partial data classes; (v) outputting a first set of prediction value(s) based on the performance of training, and a respectively corresponding first set of confidence value(s); (vi) distributing each class of the N classes of individual training data sets to a different node of a distributed machine learning system; and (vii) outputting, from the nodes of the distributed machine learning system, a second set of prediction value(s) for each class of the N classes based on the performance of training, and a respectively corresponding second set of confidence value(s), with the second set of prediction value(s) and the second set of confidence value(s) being determined by the trained in-class confidence model and the trained ML classification model.

According to an aspect of the present invention, there is a method, computer program product and/or system that performs the following operations (not necessarily in the following order): (i) receiving a full training data set including a plurality of individual training data set, with each individual training data set including a plurality of individual training data sets, with each individual training data set including data relating to a historical instantiation of a situation that is relevant to training; (ii) dividing the plurality of individual training sets into N classes, where N is an integer greater than three; (iii) dividing the N classes into M full data classes and N-M partial data classes; and (iv) performing training to obtain a trained fixed size machine learning (ML) classification model and a trained in-class confidence model, including the following types of training: (a) training a fixed sized machine learning (ML) classification model using the individual training data sets in the full data classes, (b) training an in-class confidence model using the individual training data sets in the full data classes, and (c) training the in-class confidence model using the individual training data sets in the partial data classes.

According to an aspect of the present invention, there is a method, computer program product and/or system that performs the following operations (not necessarily in the following order): (i) receiving a full training data set including a plurality of individual training data set, with each individual training data set including a plurality of individual training data sets, with each individual training data set including data relating to a historical instantiation of a situation that is relevant to training, with the full training data set including N total classes, with M full data classes and N-M partial data classes; (ii) distributing each class of the N classes of individual training data sets to a different node of a distributed machine learning system; and (iii) outputting, from the nodes of the distributed machine learning system, a second set of prediction value(s) for each class of the N classes based on the performance of training, and a respectively corresponding second set of confidence value(s), with the second set of prediction value(s) and the second set of confidence value(s) being determined by a trained in-class confidence model and a trained ML classification model.

BRIEF DESCRIPTION OF THE DRAWINGS

FIG. 5 is a block diagram helpful in understanding various embodiments of the present invention.

DETAILED DESCRIPTION

Figure 1:
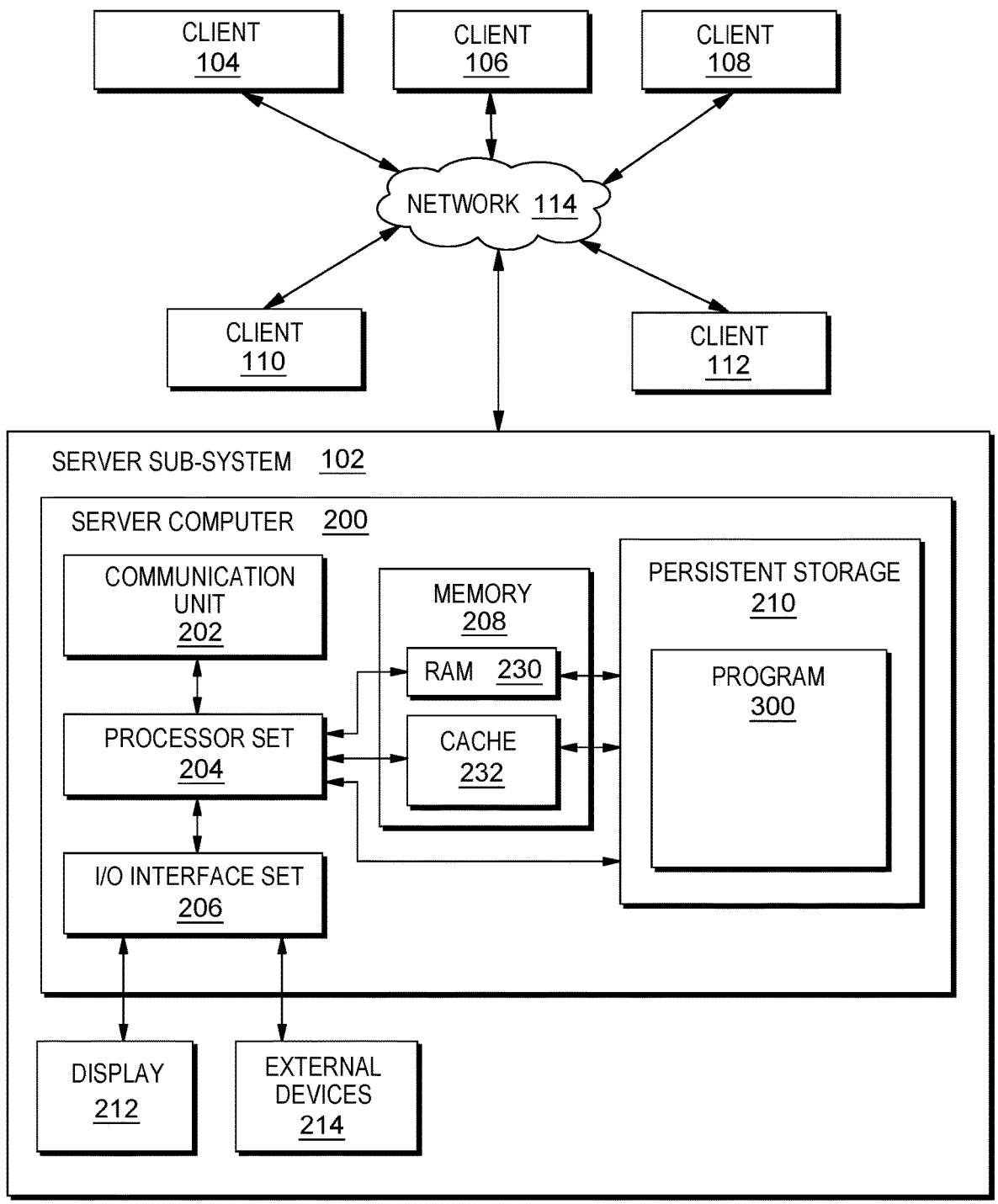
FIG. 1 is a block diagram of a first embodiment of a system according to the present invention.

Some embodiments of the present invention are directed to the whole system structure, the type of fixed-sized ML (machine learning) classification model and confidence score model is not limited and is flexible (could be random forest model, neural network model), meaning that there is no need to provide detailed information within each model, but examples discussed below do provide the input and output data type that the system needs from the model. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
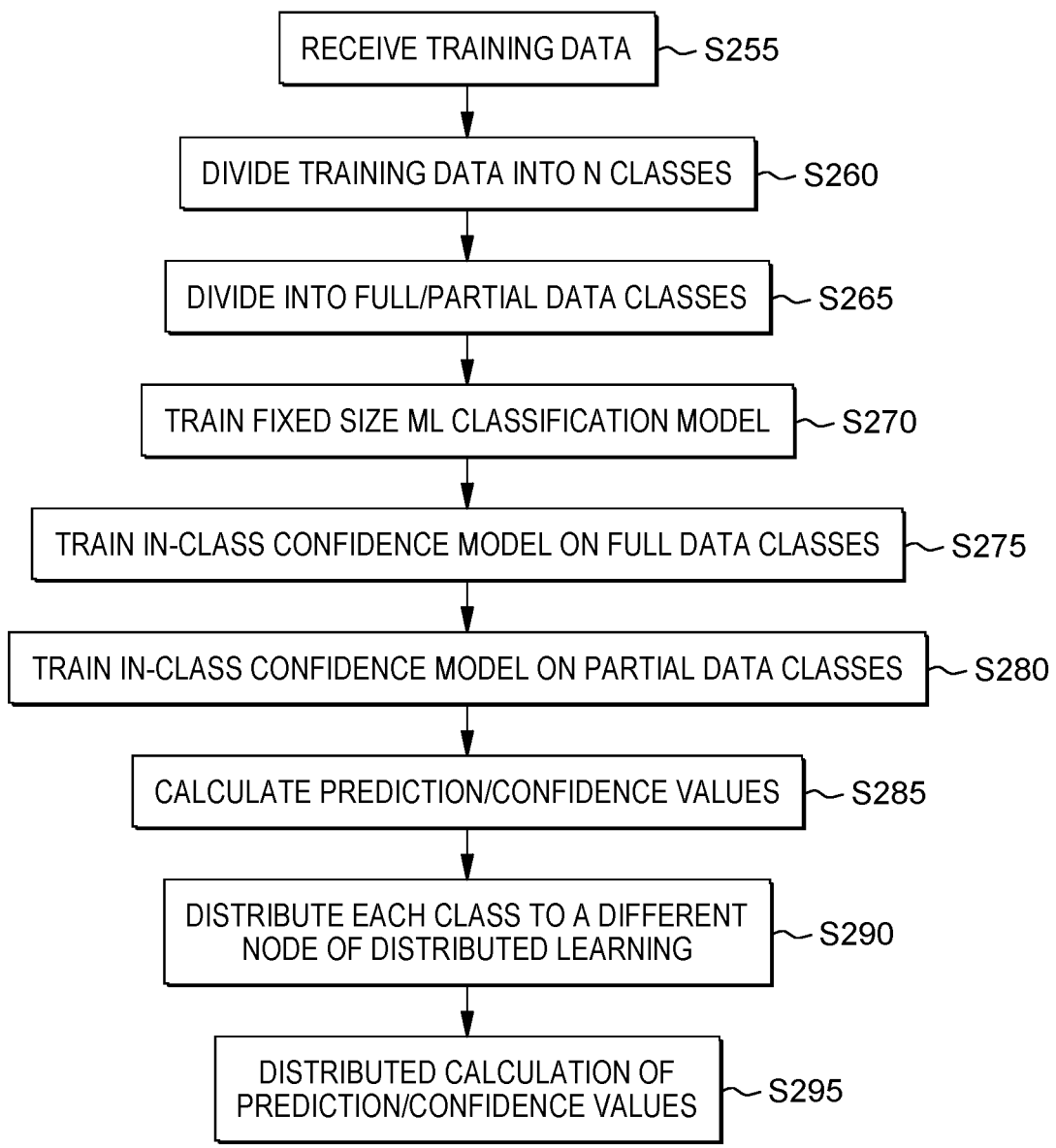
FIG. 2 is a flowchart showing a first embodiment method performed, at least in part, by the first embodiment system.
Figure 3:
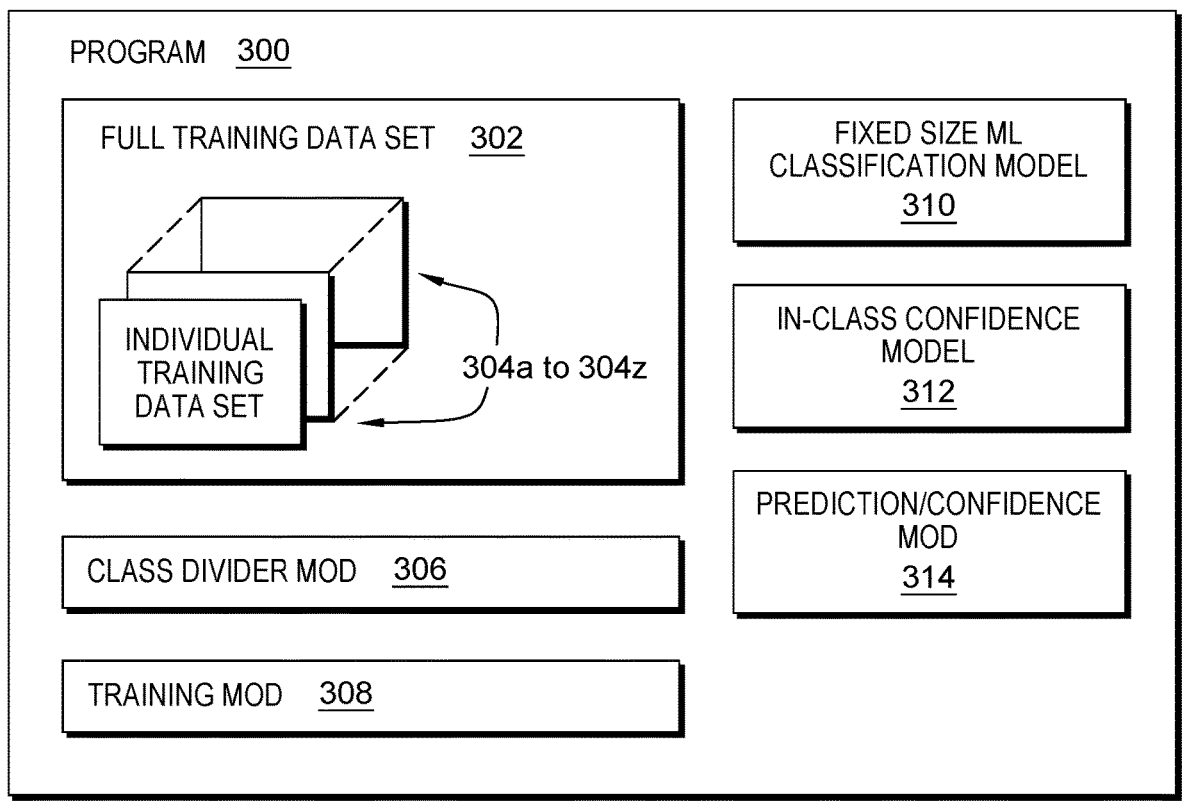
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where a full training data set 302 is received by program 300 from client subsystem 104 and through network 114. In this example, the full training data is made up of twenty-six (26) individual training data sets 304a to 304z. In many embodiments, the number of training data sets actually used will be much larger, but a relatively small number is used in this example embodiment to make it easier for the reader to follow.

Processing proceeds to operation S260, where class divider module ("mod") 306 divides the training data into N classes, where N is an integer greater than one. In this simple pedagogical embodiment, the number of classes is N=4, with the classes corresponding to individual data sets 304a to z as follows: (i) first class: 304a, c, e, g, i, k, m, o, q, s, u, w and y; (ii) second class: 304b, d, f, h, j, l, n, p, r and t; (iii) third class: 304v; and (iv) fourth class: 304x and z.

Processing proceeds to operation S265, where class divider mod 306 divides the classes into two groups as follows: (i) full data classes (in this example, the first class and the second class); and (ii) partial data classes (in this example, the third class and the fourth class).

Processing proceeds to operation S270, where training mod 308 trains fixed size ML classification model 310 on the individual data sets of the group of full data classes (that is, in this example, the first and second classes).

Processing proceeds to operation S275, where training mod 308 trains in-class confidence model 312 on the individual data sets of the group of full data classes (that is, in this example, the first and second classes).

Processing proceeds to operation S280, where training mod 308 trains in-class confidence model 312 on the individual data sets of the group of partial data classes (that is, in this example, the third and fourth classes). It is noted that the order of the foregoing operations may be re-arranged in some embodiments. In many embodiments, the foregoing operations will be going on in parallel and/or intermittently in a dynamic refinement fashion such that both models 310, 312 are substantially continuously re-trained as additional training data sets become available for analysis.

Processing proceeds to operation S285, where prediction/confidence mod 314 calculates a set of prediction value(s), P1, P2, etc., and a respectively associated set of confidence value(s), C1, C2, etc. This completes the training phase of the method of flowchart 250. The method now moves into the distributed processing phase.

Processing proceeds to operation S290, where each class (that is, in this example, first class, second class, third class and fourth class) is input to a different node in a computing system. In this example, the node assignments are as follows: (i) first class is input to a first node residing on client subsystem 106; (ii) second class is input to a second node residing on client subsystem 108; (iii) third class is input to a third node residing on client subsystem 110; and (iv) fourth class is input to a first node residing on client subsystem 106.

Processing proceeds to operation S295 where each node applies, to the respective class input to it at operation S290, the trained in-class confidence model and the trained fixed size ML confidence model in order to obtain the following outputs: (i) a prediction value for the class (called Q1, Q2, etc.); and (ii) associated confidence values for each class, D1, D2, etc.

III. Further Comments and/or Embodiments

A method of training a machine learning system according to an embodiment of the present invention includes the following operations: (i) split the training classes to each computing node (for example, if there are 50,000 training classes and 50 nodes, each node is assigned 1000 classes to train; (ii) feed the training data (full data of assigned classes) into the fixed-sized ML classification model; and (iii) feed the training data (full data of assigned classes and partial data of other classes) into the in-class confidence model. In further regard of operation (ii), the type of classification model is not limited, so it could be a random forest model, a neural network model, and the type of classification model for a particular application is chosen based on the use case. 4In further regard of operation (iii) the in-class confidence model is a binary classification model that predicts if the class belongs to the assigned classes of the node with the confidence score.

Figure 4:
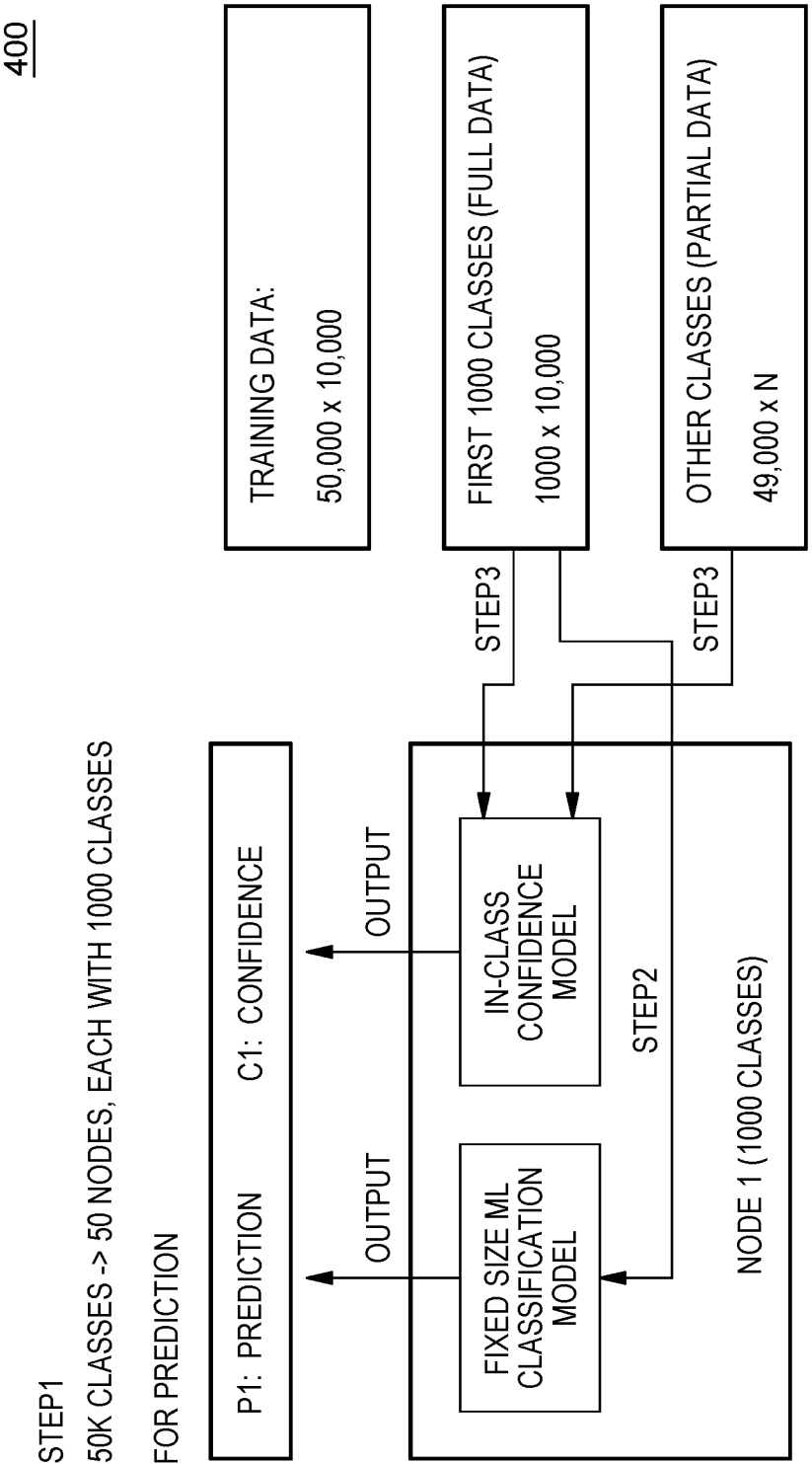
FIG. 4 is a block diagram helpful in understanding various embodiments of the present invention.

As shown in FIG. 4, diagram 400 shows an annotated, schematic illustration of the method described in the previous paragraph. This method makes use of the following equation:

$$N = \frac{\text{training data size}}{\text{out of class size}} = \frac{1000 * 10,000}{49,000}$$

A method of generating predictions with a machine learning system according to an embodiment of the present invention includes the following operations: (i) feed the testing data to each node's fixed-sized ML classification model and in-class confidence model; (ii) compare the confidence score of each node and record the node with the highest confidence score; and (iii) take the prediction result of the fixed-sized ML classification model of the recorded node as the final prediction. FIG. 5 shows a schematic diagram 500 that schematically represents the foregoing dual model prediction method.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer-implemented method (CIM) comprising:
    receiving a full training data set including a plurality of individual training data set, with each individual training data set including a plurality subset of individual training data sets, with each individual training data set including data relating to a historical instantiation of a situation that is relevant to training;
    dividing the plurality of individual training sets into N classes, where N is an integer greater than three;
    dividing the N classes into M full data classes and N-M partial data classes;
    training a fixed size machine learning (ML) classification model to obtain a trained fixed size machine learning (ML) classification model and a trained in-class confidence model, wherein training classes are split to each computing node, including the following types of training:
        training a fixed sized machine learning (ML) classification model using the individual training data sets in the full data classes,
        feeding a full data of assigned classes into a fixed-sized ML classification model;
        feeding the full data of assigned classes and partial data of other classes into the in-class confidence model;
        training an in-class confidence model using the individual training data sets in the full data classes, and
        training the in-class confidence model using the individual training data sets in the partial data classes, wherein the in-class confidence model calculates a set of prediction values and associate a set of confidence values;
outputting a first set of prediction value(s) based on the performance of training, and a respectively corresponding first set of confidence value(s);
distributing each class of the N classes of individual training data sets to a different node of a distributed machine learning system; and
applying the distributed classes to generate and output, from the nodes of the distributed machine learning system, a second set of prediction value(s) for each class of the N classes based on the performance of training, and a respectively corresponding second set of confidence value(s), with the second set of prediction value(s) and the second set of confidence value(s) being determined by the trained in-class confidence model and the trained ML classification model.

2. The CIM of claim 1 wherein the trained in-class confidence model is a binary classification model that is structured and/or programmed to predict whether a class belongs to a set of assigned class(es) of a node of the distributed ML computer system with the confidence score.

3. The CIM of claim 1 wherein the trained fixed size ML classification model is of one of the following types: random forest model and/or neural network model.

4. The CIM of claim 1 further comprises:
comparing the confidence score of each node to determine a class with the largest confidence score.

5. The CIM of claim 4 further comprising:
recording a recorded node that produced the highest confidence score.

6. The CIM of claim 1 further comprising:
taking the prediction result of the trained fixed-sized ML classification model of the recorded node as a final prediction.

7. A computer-implemented method (CIM) comprising:
receiving a full training data set including a plurality of individual training data set, with each individual training data set including a plurality subset of individual training data sets, with each individual training data set including data relating to a historical instantiation of a situation that is relevant to training;
dividing the plurality of individual training sets into N classes, where N is an integer greater than three;
dividing the N classes into M full data classes and N-M partial data classes;
training a fixed size machine learning (ML) classification model to obtain a trained fixed size machine learning (ML) classification model and a trained in-class confidence model, wherein training classes are split to each computing node, including the following types of training:
training a fixed sized machine learning (ML) classification model using the individual training data sets in the full data classes,
feeding a full data of assigned classes into a fixed-sized ML classification model;
feeding the full data of assigned classes and partial data of other classes into the in-class confidence model;
training an in-class confidence model using the individual training data sets in the full data classes, and training the in-class confidence model using the individual training data sets in the partial data classes, wherein the in-class confidence model calculates a set of prediction values and associate a set of confidence values.

8. The CIM of claim 7 further comprising:
outputting a first set of prediction value(s) based on the performance of training, and a respectively corresponding first set of confidence value(s);
distributing each class of the N classes of individual training data sets to a different node of a distributed machine learning system; and
outputting, from the nodes of the distributed machine learning system, a second set of prediction value(s) for each class of the N classes based on the performance of training, and a respectively corresponding second set of confidence value(s), with the second set of prediction value(s) and the second set of confidence value(s) being determined by the trained in-class confidence model and the trained ML classification model.

9. The CIM of claim 7 wherein the trained in-class confidence model is a binary classification model that is structured and/or programmed to predict whether a class belongs to a set of assigned class(es) of a node of the distributed ML computer system with the confidence score.

10. The CIM of claim 7 wherein the trained fixed size ML classification model is of one of the following types: random forest model and/or neural network model.

11. A computer-implemented method (CIM) comprising:
receiving a full training data set including a plurality of individual training data set, with each individual training data set including a plurality subset of individual training data sets, with each individual training data set including data relating to a historical instantiation of a situation that is relevant to training, with the full training data set including N total classes, with M full data classes and N-M partial data classes;
distributing each class of the N classes of individual training data sets to a different node of a distributed machine learning system;
training a fixed size machine learning (ML) classification model to obtain a trained fixed size machine learning (ML) classification model and a trained in-class confidence model, wherein training classes are split to each computing node comprising:
feeding a full data of assigned classes into a fixed-sized ML classification model;
feeding the full data of assigned classes and partial data of other classes into the in-class confidence model;
training the in-class confidence model using the individual training data sets in the partial data classes, wherein the in-class confidence model is configured to calculate a set of prediction values and associate a set of confidence values; and
applying the distributed classes to generate and output, from the nodes of the distributed machine learning system, a second set of prediction value(s) for each class of the N classes based on the performance of training, and a respectively corresponding second set of confidence value(s), with the second set of prediction value(s) and the second set of confidence value(s) being determined by a trained in-class confidence model and a trained ML classification model.

12. The CIM of claim 11 wherein the trained in-class confidence model is a binary classification model that is structured and/or programmed to predict whether a class belongs to a set of assigned class(es) of a node of the distributed ML computer system with the confidence score.

13. The CIM of claim 11 wherein the trained fixed size ML classification model is of one of the following types: random forest model and/or neural network model.

14. The CIM of claim 11 further comprises:
comparing the confidence score of each node to determine a class with the largest confidence score.

15. The CIM of claim 14 further comprising:
recording a recorded node that produced the highest confidence score.

16. The CIM of claim 11 further comprising:
taking the prediction result of the trained fixed-sized ML classification model of the recorded node as a final prediction.

17. The CIM of claim 1 further comprising:
feeding testing data to each node's fixed-sized ML classification model and in-class confidence model.

* * * * *